May 18, 1965 W. HAMMESFAHR 3,183,549
HOLDER GRIP, PARTICULARLY FOR MOTOR VEHICLES
Filed Jan. 7, 1963 2 Sheets-Sheet 1
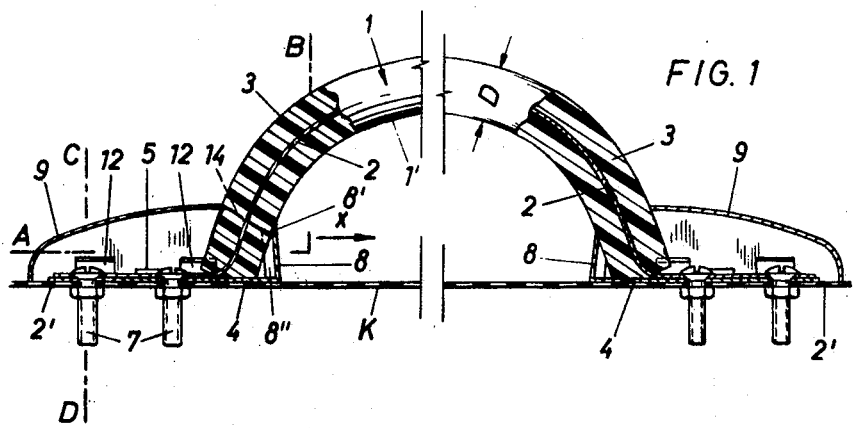
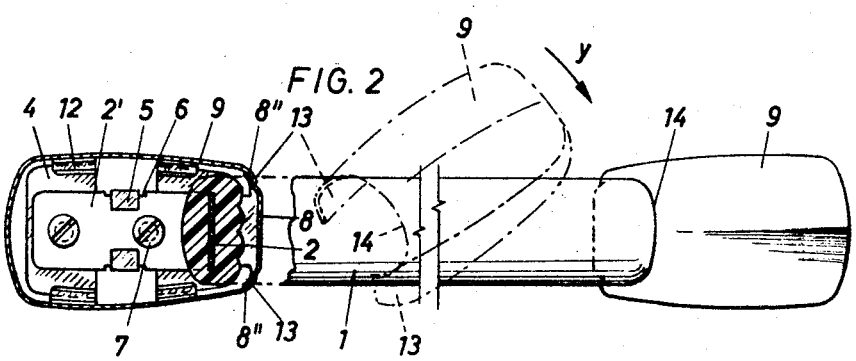
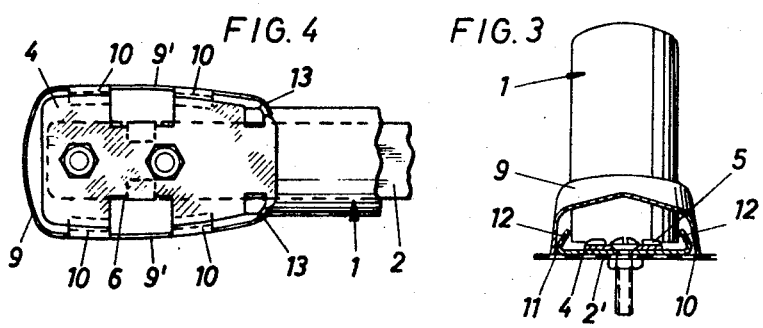
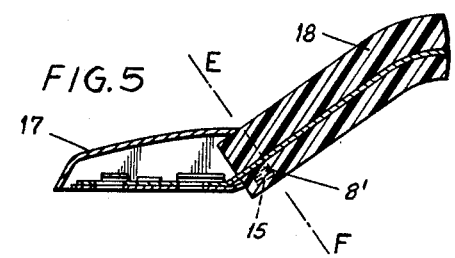
INVENTOR
WILLI HAMMESFAHR
BY: Dicke & Craig
ATTORNEYS

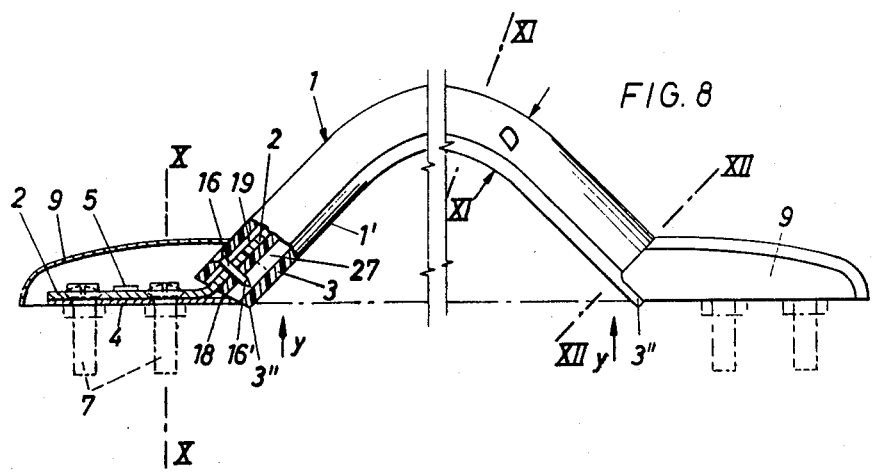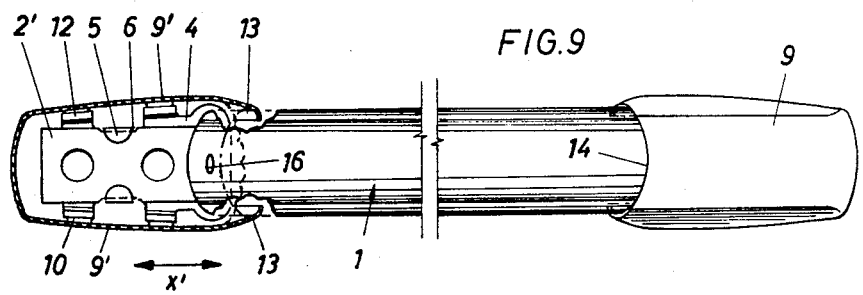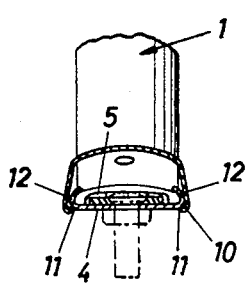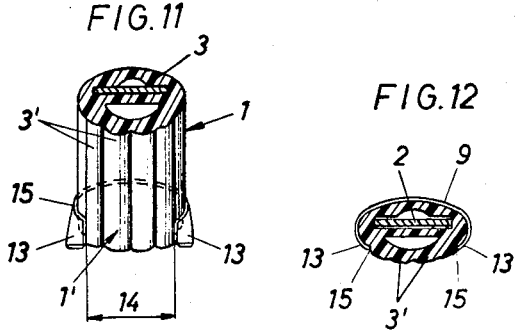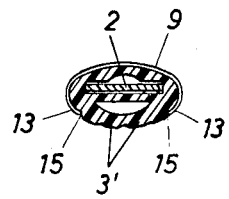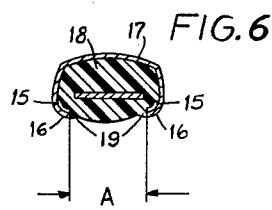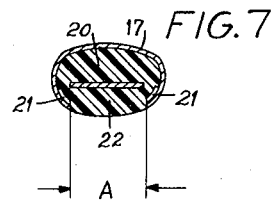
INVENTOR
WILLI HAMMESFAHR
BY Dicke & Craig
ATTORNEYS

United States Patent Office 3,183,549
Patented May 18, 1965

3,183,549
HOLDER GRIP, PARTICULARLY FOR
MOTOR VEHICLES
Willi Hammesfahr, Solingen-Wald, Germany, assignor to
Gebr. Happich G.m.b.H., Wuppertal-Elberfeld,
Germany
Filed Jan. 7, 1963, Ser. No. 249,729
Claims priority, application Germany, Jan. 12, 1962,
H 44,592; Feb. 24, 1962, H 44,996
12 Claims. (Cl. 16—125)

The present invention relates to a holder grip, particularly for motor vehicle bodies, having caps covering each of the attachment points of the grip, capable of being clipped onto an attachment base plate and leaving a passage opening clear for the flexible grip yoke consisting of an enveloped steel strip core.

It causes difficulties to cover the attachment points of such hand grips by means of clip-on caps. On the one hand, the clipping-on of the cap should be made as easy as possible and a tight seal of the passage opening for the grip yoke should be attained, on the other hand however the unforeseeable tensile and twisting stresses and concomitant movements of the grip yoke must not lead to a loosening of the clip-on attachment. This danger of loosening arises in an increased manner, when the marginal edge of the passage opening formed by the cap abuts the envelope of the grip yoke; movements of the grip yoke are then transmitted to the cap.

Various coverings of the grip attachment point, which have become known for this purpose, let the cap terminate in the region of the lateral flanks of the grip yoke. A simple clip-on attachment of the cap is then incapable of holding the same safely against all stresses arising in use. Accordingly embodiments have also become known, in which the cap has a passage hole enclosed from all sides. In this case, the holding of the cap is improved as regards the stresses mainly occurring in use, even when merely a light clip-on attachment is effected; however the disadvantage occurs from the point of view of the fitting technique, that the grip yoke has to be pulled through the hole enclosed from all sides of the cap, prior to its being mounted. Since such grips are in general supplied with the base plate already attached to the steel strip core, the pulling through of the grip yoke has to be carried out already when assembling the grip. The caps then either hang loosely on the grip yoke or are clipped on to the base plate; in the first case there is the danger of being scratched even on delivery and storage, in the second case, when fitting the grip to the motor vehicle, firstly the cap must be clipped off the base plate, shifted to the middle region and then, after the grip has been fitted to the motor vehicle, has to be clipped on again. Moreover, when replacement caps are to be fitted, always the whole grip has to be dismantled, and in particular the attachment plate has to be detached from the steel strip core.

It is an object of the present invention to provide a holder grip of the kind referred to, in such a manner, that on the one hand an easy fitting, and on the other hand a holding of the cap on the base plate is attained, which is reliable in operation, even when the holding is effected merely by a light-clip-on attachment.

According to the invention this is achieved thereby that the cap has two horns reaching up to the inside of the grip yoke, which horns leave between one another a gap free for insertion.

Owing to this arrangement it is attained that the cap can be stored and supplied on the one hand, separately from the grip yoke provided with the base plates, and, on the other hand, after being clipped-on is held in a manner sufficient for resisting all stresses occurring in use. For mounting the cap at the attachment point of the grip, the cap is pushed over in such a manner, that the grip yoke passes through the insertion gap. This is preferably effected while slightly turning the cap. The width of aperture of the insertion gap corresponds for this purpose at least approximately to the thickness of the grip yoke.

The inherent resiliency of the cap allows its being turned into a position parallel to the axis of the grip yoke, and its being pushed in the direction of the attachment point, where the cap is then clipped-on over the corresponding edges of the base plate.

The inherent resiliency of the cap permits at the same time a snug, form-closed contact of the marginal edges of the passage opening with the grip yoke. Owing to the horns extending to the inside of the grip yoke, moreover a sufficient hold of the grip against stresses occurring in use is attained. Without detaching the grip or dismantling the same, replacement caps may be fitted. The sightliness of the grip is not impaired, because the horns terminating at the inside of the grip yoke are hidden from view to a great extent, since they lie outside the angle of vision normally to be expected. Owing to these horns embracing the grip yoke and leaving the insertion gap clear between one another, and in co-operation with the inherent resiliency of the cap moreover a clamping effect between the marginal edges of the passage opening and the envelope of the grip yoke is attained.

A development of the invention which is favourable as regards the attachment consists in that the horns of the cap overlap an upwardly directed angular turn up of the attachment base plate. Thereby it is moreover attained that the insertion gap between the horns appears closed, when the grip is mounted. Primarily any shifting of the cap by tensile stresses in the longitudinal direction of the grip yoke is prevented.

In this respect it is advantageous when according to this feature of the invention the grip yoke bears on the upper edge of the upwardly directed angular turn up.

A smooth sightly shape is attained according to the invention thereby that the upwardly directed angular turn up is stepped at its marginal zones, where it is overlapped by the horns. When the height of the steps corresponds to the thickness of the material of the cap, a flush surface is formed.

An advantageous attachment of the end of the grip yoke to the attachment base plate is attained according to a feature of the invention thereby that a bare, holed end of the steel strip core resting on the base plate is arrested by lugs turned up from the base plate, and the steel strip core has recesses for being engaged by the lugs, the width of which corresponds approximately to that of the said lugs. The holes in the steel strip core which register with holes in the base plate, may be used for the fitting of the grip to the motor vehicle body. The arresting of the steel strip core then effected by means of two attachment screws passing through these holes, and the fixation by means of the said lugs assures such a stable holding of the grip yoke that at the contact points between the envelope of the grip and the cap lying slightly higher up no twisting stresses can occur which exceed the holding force between the cap and the base plate.

Another embodiment of the invention even exceeding those described in usefulness consists in that the angular turn up of the base plate is formed by two part-turn ups lying spaced apart from one another, and that the envelope of synthetic material of the grip yoke engages into the interstice between these part-turn ups. This embodiment is advantageous primarily from the point of view of production. The provision of two part-turn ups, which brings about the same advantage as regards stability as the provision of a single turn up extending over the whole width, saves in particular the necessity of a glossy finish of the overlapped surfaces. When the part-turn ups are completely overlapped by the horns of the cap any glossy finish of the attachment base plate is dispensed with. It has been found advantageous according to the invention, when the cap is held at each of its two lower lateral edges at two clipping points spaced apart from one another. An additional holding at the outer end of the cap can be dispensed with owing to the horns, and the lateral clip-on attachments need not be so constructed, that a longitudinal shifting of the cap is obviated. The longitudinal shifting of the cap is prevented anyway by the horns adjacent the passage opening.

In a further development of the invention the horns reaching to the inside of the grip yoke bear on the envelope.

Owing to this construction the angular turn up provided on the base plate is abolished. This means savings in material and at the same time dispenses with any glossy finish to be applied to the base plate. When the grip is fitted, no structural part of the base plate is visible any more. On the other hand it has been found that the direct contact of the horns with the resilient envelope is preferable even from the point of view of use. The resiliency of the envelope can then be used for an additional holding of the cap by pre-loading. Nevertheless there is no danger of the cap working itself loose under stresses arising in use.

An advantageous development of this embodiment of the invention is achieved thereby that the envelope has recesses on the inside of the grip yoke to be engaged by the horns. This brings about a substantially covered up arrangement of the horns, and moreover abolishes the danger of injuring oneself on the horns or getting entangled on them with any articles. Moreover the horns are arrested in position by these recesses.

A useful embodiment of the invention, which obviates the occurrence of stresses in the cap caused by loads occurring in use, and which accordingly also prevents the horns from being bent up by any major stresses, is attained thereby that the cap is held exclusively at the lateral edges of the attachment base plate.

A further advantageous embodiment of the invention consists in that each inside end of the resilient envelope protrudes downwardly beyond the attachment base plate. Thereby it is attained that this protruding edge of the envelope is slightly upset by the base plate, when fitting the grip. Hence a gap-free contact of the grip yoke with the attachment wall is attained; the upsetting is, by the way, advantageous for the holding of the cap, the horns of which embrace the envelope substantially above this upset.

A development of the invention, which is favourable from the point of view of production and use consists in that the resilient envelope has a hollow channel running along the inside of the steel strip core of the grip yoke, for the entry of a nail, pin or the like to be driven home from outside the grip yoke, and securing the envelope against being displaced on the steel strip core in a manner known per se. The driving home of such a pin from outside the grip yoke requires that the pin lies below the cap; the pin protrudes with its free end into the hollow channel of the envelope. Accordingly it does not show itself on the inside of the grip yoke. It does not push through either, so that any danger of injury is obviated. When driving home the pin, moreover a counter-abutment may be inserted from the free end of the hollow channel, so that the point of the pin is turned up immediately.

Four embodiments of the invention are illustrated by way of example in the accompanying drawings, in which:

FIG. 1 is a longitudinal section of the grip,
FIG. 2 is a section on the line A–B of FIG. 1,
FIG. 3 is a section on the line C–D of FIG. 1,
FIG. 4 is a plan view from underneath towards an attachment point of the grip,
FIG. 5 is a longitudinal section through the grip attachment end of a second embodiment,
FIG. 6 is a section on the line E–F of FIG. 5,
FIG. 7 is a section corresponding to FIG. 6 of a third embodiment,
FIG. 8 is a side elevation of a fourth embodiment of the grip, partly in longitudinal section,
FIG. 9 is a plan view of this grip, likewise partly in section,
FIG. 10 is a section on the line X—X of FIG. 8,
FIG. 11 is a section on the line XI—XI of FIG. 8,
FIG. 12 is a section on the line XII—XII of FIG. 8.

The holder grip has a flexible grip yoke 1 consisting of a steel strip core 2 and an envelope 3, which is preferably made of a suitable synthetic material. The steel strip core 2 is bare at both its ends 2', and is connected there with the attachment base plate 4. The connection is effected by means of lugs 5 turned up from the base plate which are folded over the steel strip core. The lugs 5 thereby engage into corresponding recesses 6 at the lateral edges of the steel strip core 2. The ends 2' of the steel strip core 2 rest immediately upon the attachment base plate 4. The attachment base plate 4 is mounted by means of screws 7 to a wall of the car body or the like. The screws 7 penetrate at the same time through holes in the steel strip core 2.

The attachment base plate 4 has an angular turn up 8 lying on the inside of the grip yoke. This turn up is directed upwardly. The envelope 3 of the grip yoke 1 abuts the upper edge 8' of this upwardly directed turn up, so that a support is provided for the grip yoke against tensile forces in the direction of the arrow X, and moreover a support for the angular turn up against being bent in the opposite direction.

The attachment point of the grip is completely covered by a cap 9. This cap 9 has one end completely open to accommodate the grip yoke and is clipped-on to the base plate 4. For this purpose it has inwardly bent tongues 10 on its two lower lateral edges. The same enter in the holding position below the clip-on edges 11 of lugs 12 angularly turned up from the lateral edges of the base plate 4. On the whole there are provided four such clip-on points. Two of them lie at one side and two at the other side of the base plate 4. The clip-on points are arranged opposite one another. They allow inherently a shifting to-and-fro of the cap in the direction of the double arrow X' (FIG. 9).

The cap 9 has two horns 13, which extend right to the inside 1' of the grip yoke and accordingly embrace the grip yoke 1 reaching the inside 1' of said grip yoke. The horns 13 form part of the boundary for the open end of the cap 9 and are proportioned to provide a gap 14 for insertion of the grip yoke above the horns 13. This insertion gap corresponds at least to the thickness D of the grip yoke 1. This permits, as follows from FIG. 2, the mounting of the cap 9 in the position indicated in phantom lines; it is firstly pushed over the grip yoke in the transverse direction, so that the grip yoke 1 passes transversely through the insertion gap 14; then the cap is turned in the sense of the arrow y into the position parallel to the axis of the grip yoke. The horns 13 of the cap overlap the upwardly directed angular turn up 8 of the attachment base plate 4 (FIG. 2). The upwardly directed angular turn up 8, which serves to complete the closure of the attachment point provided by the cap, is stepped at its margin zones 8" where it is overlapped by the horns 13.

In the embodiment according to FIG. 5 two separate angular turn ups 15 are provided in the region of the flanks of the grip. The same are completely overlapped by the horns 16 of the cap 17. The envelope 18 of synthetic material of this grip reaches with two ribs 19 extending over the whole length into the interstice A between the two part-turn ups 15. Thereby a good fixation of the position is attained. Moreover the outer surfaces of these angular turn ups need not be given a glossy finish. The grip yoke 1 runs at an angle towards the base plate 4; the angular turn up 8' includes an obtuse angle with the base plate 4. When the yoke grip *a* has a thickness varying along its length, the clear distance between the horns may advantageously correspond to the smallest thickness of the yoke grip.

In the embodiment according to FIG. 7, the engaging of the envelope 20 of synthetic material of the grip yoke into the spacing "A" between the two part-turn ups 21 is attained thereby, that a single rib 22 of appropriate width is provided which extends from the inside.

In the embodiment according to FIGS. 8 to 12 the horns abut directly the resilient envelope 3 of the grip yoke 1. In the holding position the horns engage into recesses 15, which are provided on the inside of the envelope 3. These recesses are formed by ribs 3' extending on the inside of the envelope over the entire length thereof.

The resilient envelope protrudes at each end downwardly beyond the attachment base plate 4. Thus projecting edges 3" are formed. When fitting the grip to the wall of a car body or the like, these edges 3" are pressed inward in the direction of the arrow Y. This results in a gap-free contact between the wall of the car body and the envelope; besides, the upsetting of the end of the envelope is favourable to the holding of the cap 9, and also in view of a gap-free closure of the passage opening of the cap 9.

At both ends of the grip yoke 1 a pin 16 is provided which is driven home from outside the grip yoke and penetrates the resilient envelope 3 as well as the steel strip core 2. The free end 16' of this pin 16 penetrates into a hollow channel 27 of the resilient envelope 3. The free end 16' does not show on the inside of the grip yoke. If desired, a counter-abutment in the form of an anvil or the like may be pushed into the hollow channel 27 so that the free end 16' of the pin 16 is turned up immediately after having penetrated a partition wall 18 separating the hollow channel 27 from a hollow channel 19, which receives the steel strip core 2.

The cap 9 may be made of various materials. The resiliency required for clipping it on results from the structure of the cap. In the region of the passage opening for the grip yoke the resiliency properties of the cap are not relevant, since there a resilient contact takes place on the compressible envelope 3 of the grip yoke 1.

While I have described herein and illustrated in the accompanying drawings what may be considered typical and particularly useful embodiments of my said invention, I wish it to be understood that I do not limit myself to the particular details and dimensions described and illustrated; for obvious modifications will occur to a person skilled in the art.

What I claim as my invention and desire to secure by Letters Patent, is:

1. A holder grip arrangement comprising in combination: an attachment base plate, a flexible grip yoke having a steel strip core and a resilient synthetic plastic envelope attached at both ends to said base plate, and a cap clipped on to each said base plate so as to cover the respective ends of said grip yoke attached thereto, each of said caps having an open end defined by two horns extending to the inside of said grip yoke and leaving between them an insertion gap for said grip yoke.

2. A holder grip arrangement as claimed in claim 1, comprising two clip-on points on either lateral side of said cap arranged on the lower lateral edges thereof and spaced from one another.

3. A holder grip arrangement as claimed in claim 1, wherein said horns of said caps abut said envelope at the inside of said grip yoke.

4. A holder grip arrangement as claimed in claim 1, wherein said envelope has recesses at the inside of said grip yoke, said horns of said caps engaging into said recesses.

5. A holder grip arrangement as claimed in claim 1, wherein said caps are held exclusively at the lateral edges of said attachment base plate.

6. A holder grip arrangement as claimed in claim 1, wherein the inner edges at the ends of said envelope protrude beyond said attachment plate and are supported by contact therewith.

7. A holder grip arrangement as claimed in claim 1, wherein said resilient synthetic plastic envelope has a longitudinal hollow duct running along the inside of said steel strip core of said grip yoke, and comprising pins driven home from the outside of said grip yoke into said hollow duct and securing said envelope against being displaced relative to said steel strip core.

8. A holder grip arrangement as claimed in claim 1, wherein said attachment base plate has an angular turn up adjacent the inside of each end of said grip yoke, said horns of said caps overlapping said turn up.

9. A holder grip arrangement as claimed in claim 8, wherein the inside of said resilient envelope bears on the upper edges of said angular turn ups.

10. A holder grip arrangement as claimed in claim 8, wherein said angular turn ups have stepped lateral edges, said horns of said caps engaging the narrower parts of said stepped turn ups so as to lie flush with the wider parts thereof.

11. A holder grip arrangement comprising in combination: an attachment base plate, a flexible grip yoke having a steel strip core with bores provided adjacent its ends and a resilient synthetic plastic envelope enveloping said steel strip core except at its bored ends, the latter contacting said base plate with their bores registering with corresponding bores in said base plate, said base plate having lateral turn ups and said steel strip core having corresponding lateral recesses engaged by said turn ups, and attachment means penetrating through said registering bores and connecting said steel strip core with said base plate.

12. A holder grip arrangement as claimed in claim 11, wherein said lateral turn ups are arranged in pairs spaced apart from one another and wherein said resilient synthetic plastic envelope engages into the interstices of said pairs of turn ups.

References Cited by the Examiner

UNITED STATES PATENTS 773,835    11/04    White _____ 16—125

FOREIGN PATENTS 828,421    2/60    Great Britain.
569,263    11/57    Italy.

DONLEY J. STOCKING, *Primary Examiner.*